July 22, 1947.  J. FRIER  2,424,445
MACHINE FOR COATING AND OPENING FLEXIBLE TUBING
Filed Feb. 25, 1943  2 Sheets-Sheet 1
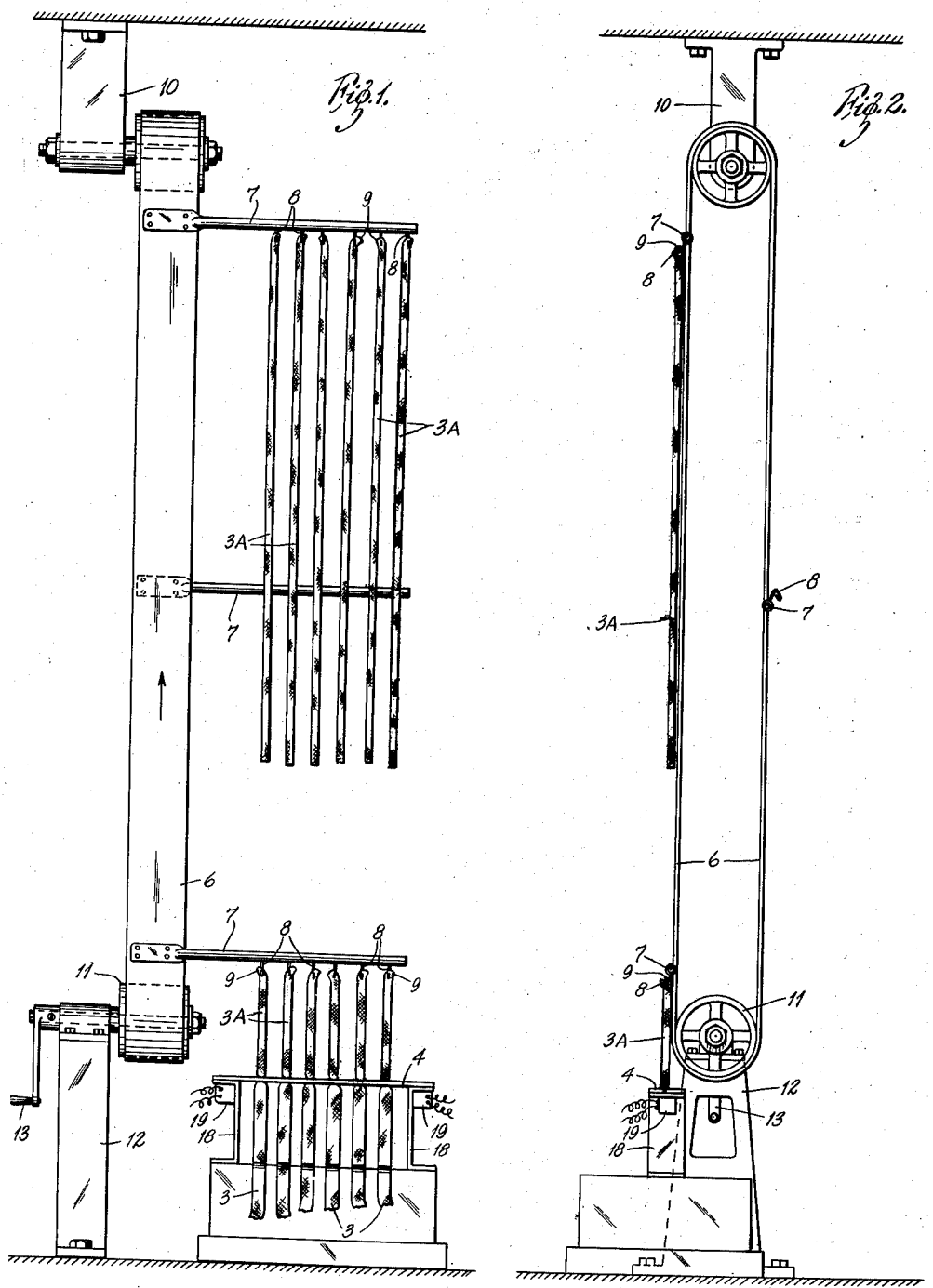

July 22, 1947.  J. FRIER  2,424,445
MACHINE FOR COATING AND OPENING FLEXIBLE TUBING
Filed Feb. 25, 1943  2 Sheets-Sheet 2
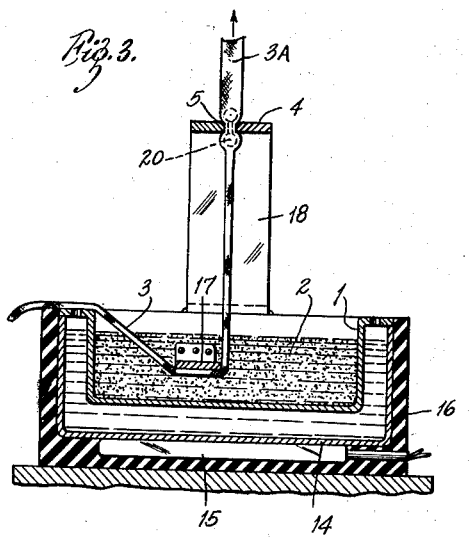
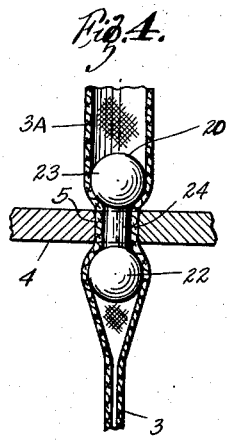
INVENTOR:
John Frier,
By Carr Van Gravely,
HIS ATTORNEYS.

Patented July 22, 1947

2,424,445

UNITED STATES PATENT OFFICE 2,424,445

MACHINE FOR COATING AND OPENING FLEXIBLE TUBING

John Frier, Webster Groves, Mo.

Application February 25, 1943, Serial No. 477,093

1 Claim. (Cl. 91—32)

My invention relates to the coating of flexible tubing, as tubing of textile material, with a protective or other coating, to the wiping of excess coating material from the tubing and to the spreading or opening of the tubing from closed or flattened condition to opened or expanded tubular condition and particularly to a machine for coating and opening flexible tubing.

There are many types of flexible tubing which require a coating for various reasons, as electrical insulation, protection against heat or protection against the action of particular substances. Such coatings are usually applied by passing the tubing through a liquid bath of the coating material, the coating material subsequently hardening in place. The coating material penetrates into the body of the tubing, sometimes as far as the inside wall, and I use the term "coating" to include this permeation or penetration as well as any shell or case that may be disposed wholly on the outside of the tubing. In the operation of making the tubing, in the coating operation or in both, the tubing ordinarily assumes a flattened or closed condition and may have twists and sharp kinks therein. In many cases, as in the case of electrical insulating tubing, where it is very difficult to slip a closed or flattened tube over a wire, but quite easy to perform that operation with a fully opened tube, it is obviously of importance to spread the coated tubing into the open tubular condition that it must have in final use and to remove any bends or kinks that might interfere with the use of the tubing. It is also of importance to remove any excess coating material from the coated tube.

The principal object of my invention, therefore, is a machine which will remove any excess coating material from the coated tube and which will open up the tube into its desired tubular shape and remove any bends or kinks therefrom. Other objects and advantages will appear hereinafter.

The invention consists principally in providing a coating tank for the above described operation with a perforated wiper member through which the coated tubing passes and placing a spreader or opener in the tubing, such spreader being slightly larger than the opening in the wiper member; so that by the cooperation of the spreader and wiper member, the tubing is opened up and straightened out and excess coating material removed therefrom. The invention further consists in the machine for coating and opening flexible tubing and in the parts and combinations and arrangements of parts hereinafter described and claimed.

In the accompanying drawings, wherein like reference characters refer to like parts wherever they occur.

Fig. 1 is a diagrammatic elevational view of an apparatus for coating and opening flexible tubing embodying my invention;

Fig. 2 is an end view thereof;

Fig. 3 is a cross-sectional view through the coating tank and wiper member portion of the apparatus; and Fig. 4 is a fragmentary sectional view on an enlarged scale showing the spreader member and wiper member.

The machine illustrated in the drawings is adapted for the simultaneous coating and handling of a plurality of lengths of tubing. In general, the apparatus includes a coating tank 1 containing a bath of liquid coating material 2 through which lengths of tubing 3 pass. A perforated wiper member 4 has a separate hole 5 for each length of tubing 3 to pass through as it leaves the bath 2, and an endless belt conveyor 6 has a plurality of arms 7 on which are hooks 8 for engaging the ends 9 of the lengths of tubing as they emerge from the bath. A suitable hanger 10 is provided for the upper end of the conveyor belt 6 and a pulley 11 for the lower end is mounted in a suitable pedestal 12 and provided with a handle 13 for rotating it. As the forward reach of the belt 6 moves upwardly, it carries with it an arm or arms 7 from which are suspended coated lengths of tubing 3A which are thus given time to dry out and an arm 7 which carries lengths of tubing 3 through the coating bath 2 and the perforated wiper member 4 to coat, wipe, open out and straighten the several lengths of tubing.

In the construction shown in Fig. 3, the coating tank 1 is provided with a water jacket 14 that is heated by means of an electric heater 15 or the like and with an insulated outer casing 16. The apparatus illustrated is for the coating and impregnating of electrical insulation tubing with molten paraffin 2, the wiping of excess paraffin from the tubing and the straightening and opening of the tubing.

The several lengths of tubing 3 pass downwardly into the bath 2 and under a guide strip 17 which extends from end to end of the coating tank, thence upwardly through holes 5 provided in the wiper bar 4 which is mounted on brackets 18 that are secured to the coating tank 1. In order to prevent too quick chilling of the coating, the wiper member 4 may be heated by means of electrical heaters 19 secured to the mounting brackets 18, as shown in Fig. 1. The several lengths of tubing 3 are moved through the bath and through the wiper member 4 by the conveyor and feeder arrangement above described.

Mounted in each length of tubing is an opener or spreader member 20 of the generally dumbbell shape with one large end 22 below the wiper member and the other large end 23 above the wiper member, the reduced middle portion 24 being disposed in the opening 5 of said wiper member 4. The wiper member 4 is in two parts or split, so as to permit assembly around the reduced middle portion of the spreader or the spreader itself might be split to permit assembly. The cooperation of the spreader member and wiper member 4 opens up the tube, straightens out any kinks therein and removes any excess coating material that may adhere either to the outside or to the inside of the tubing.

In describing the spreader as being larger than the opening in the wiper member, the effective size of the opening, as reduced by the thickness of the tubing in the hole may be considered, that is the spreader might be small enough to pass through the wiper hole and still operate, so long as the difference is not more than twice the thickness of the tubing being treated.

The above described machine is adaptable to the application of liquid coatings of all sorts and for all purposes, whether for protection against various substances or conditions or for purely ornamental purposes and whether the bath is liquid because of being in a heated condition or is liquid at ordinary temperatures.

Obviously, numerous changes may be made without departing from the invention and I do not wish to be limited to the precise arrangements and features shown and described.

What I claim is:

Means for coating and opening flexible tubing and wiping excess coating material therefrom comprising a bath of coating material, a wiper member having an opening through which the tubing passes and a spreader of dumbbell shape in said tubing, the enlarged portions of said spreader being above and below said wiper member respectively and the reduced middle portion thereof extending through said opening in said wiper member.

JOHN FRIER.

REFERENCES CITED

The following references are of record in the file of this patent:

UNITED STATES PATENTS

| Number | Name | Date |
| --- | --- | --- |
| 1,805,245 | Hopkinson et al. | May 12, 1931 |
| 1,864,674 | Schur | June 28, 1932 |
| 1,880,050 | Schur | Sept. 27, 1932 |
| 2,100,587 | Chalker | Nov. 30, 1937 |
| 1,631,651 | Skogland | June 7, 1927 |
| 2,324,645 | Prehler | July 20, 1943 |
| 1,796,338 | Moore | March 17, 1931 |
| 2,350,857 | Wolff | June 6, 1944 |